United States Patent [19]

Nowakowski et al.

[11] 4,319,926

[45] Mar. 16, 1982

[54] CURABLE SILICATE COMPOSITIONS CONTAINING CONDENSED PHOSPHATE HARDENERS AND PH CONTROLLING BASES

[75] Inventors: Peter M. Nowakowski, Glenshaw; William G. Boberski, Gibsonia; Jerome A. Seiner, Pittsburgh, all of Pa.

[73] Assignee: PPG Industries, Inc., Pittsburgh, Pa.

[21] Appl. No.: 218,861

[22] Filed: Dec. 22, 1980

[51] Int. Cl.$^3$ .............................................. C04B 19/04
[52] U.S. Cl. ........................................... 106/74; 106/84
[58] Field of Search ..................................... 106/74, 84

[56] References Cited

U.S. PATENT DOCUMENTS 3,625,722 12/1971 von Freyhold et al. .............. 106/84
3,669,699 6/1972 Doi et al. ................................ 106/74
3,930,876 1/1976 Nakajima et al. ...................... 106/74

Primary Examiner—James Poer
Attorney, Agent, or Firm—Thomas M. Breininger

[57] ABSTRACT

Disclosed is a curable composition consisting essentially of (a) from about 10 to about 32 percent by weight of a water-soluble and/or water dispersible alkali metal silicate; and
(b) from about 2 to about 10 percent by weight of a metal condensed phosphate hardener in the form of an aqueous dispersion containing a water-soluble base in an amount such that the pH of the aqueous dispersion of the hardener is greater than 9.5.

Also disclosed is a method of preparing such a curable composition.

27 Claims, No Drawings

CURABLE SILICATE COMPOSITIONS CONTAINING CONDENSED PHOSPHATE HARDENERS AND PH CONTROLLING BASES

BACKGROUND OF THE INVENTION

Environmental pollution concerns have led those in the coatings and resins arts to develop curable compositions from which organic petroleum based solvents have been eliminated or at least substantially reduced. Additionally, the high cost and scarcity of petroleum by-products has generated interest in the development of curable compositions based entirely, or at least substantially, on inorganic components.

Inorganic coating compositions based on alkali metal silicates and inorganic phosphate hardeners are known. However, when alkali metal silicates and inorganic phosphate hardeners are mixed, they tend to rapidly coagulate, solidify or the like due to the strong reactivity between the silicate and the phosphate. The particles or small lumps formed in these alkali silicate/phosphate hardener compositions, due to this tendency toward prematurely rapid reaction are undesirable, for example, in applications employing spraying techniques. Additionally, cured coatings produced from compositions containing such particles contain undesirable lumps.

A method is described in U.S. Pat. No. 3,930,876 directed to preventing the rapid reaction of the silicate with the phosphate to increase pot life wherein a condensed phosphate hardener prepared using double-oxides having the "spinel" structure is pretreated with a silicate or a modified silicate to form a slurry or paste having a pH of 5 to 9.5, preferably 6 to 8.5. The procedure described therein requires that the condensed phosphate hardener be prepared using a double oxide having a "spinel" structure. The pretreatment of the hardener described in U.S. Pat. No. 3,930,876 generally takes from 10 to 30 hours and produces an inert coating on the phosphate hardener containing no free acid rendering it less reactive.

The present invention is directed to curable inorganic coating compositions based on water-soluble and/or water-dispersible alkali metal silicates which are relatively storage stable, essentially lump-free, easily sprayable, and curable at relatively low temperatures to smooth, essentially lump-free, durable coatings which are resistant to high temperatures, water, detergents and cracking. The invention is also directed to a method for producing the compositions of the invention and to a method of forming coatings from the compositions. Coatings produced from the compositions of the invention are suitable for use, for example, as a replacement for porcelain in appliances. It is notable that coatings prepared from the compositions of the present invention are substantially less energy intensive than porcelain coatings and essentially lump free as compared to coatings prepared from aqueous silicate/condensed phosphate hardener compositions generally known in the art.

SUMMARY OF THE INVENTION

The aqueous compositions of the present invention substantially comprise inorganic constituents. They are aqueous materials comprising a specified amount of an aqueous alkali metal silicate and a specified amount of an aqueous dispersion of a metal condensed phosphate hardener containing a water-soluble base such that the pH of the dispersion is greater than 9.5 and typically at least 10. The compositions are produced by mixing the aqueous silicate with the aqueous dispersion of the metal condensed phosphate hardener for which the pH has been adjusted to greater than 9.5 with the water soluble base. The pH adjustment of the dispersion of the condensed phosphate hardener minimizes shock (i.e., the formation of undesirable particles or lumps) in the compositions of the invention. The compositions additionally may contain a pigment, a filler, various additives and mixtures thereof.

DETAILED DESCRIPTION OF THE INVENTION

The present invention comprises an aqueous curable composition consisting essentially of (A) from about 10 to about 32 percent by weight of a water-soluble and/or water-dispersible alkali metal silicate; and (B) from about 2.0 to about 10 percent by weight of a metal condensed phosphate hardener in the form of an aqueous dispersion containing a water soluble base. The amount of base in the dispersion of hardener is sufficient to raise the pH of the hardener dispersion to greater than 9.5, typically to at least 10. The ability to include such high levels of base in the hardener dispersions in the present compositions is indeed surprising considering the generally known adverse effects that high levels of base typically have on properties of silicate-based coatings such as water resistance and resistance to blistering. Yet the compositions of the present invention cure to smooth essentially lump-free, durable coatings having excellent water, detergent, heat and cracking resistance.

Water-soluble and/or water-dispersible alkali metal silicates (component A), which may be used in the compositions of the invention, include, for example, sodium silicate, potassium silicate and lithium silicate. Preferred aqueous silicates for component A include solutions and/or dispersions, preferably solutions, of sodium and/or potassium silicates, commonly referred to as waterglasses. Potassium silicate waterglass is particularly preferred. The water-soluble and/or water-dispersible alkali metal silicates suitable for the present invention have a $SiO_2:M_2O$ mole ratio generally ranging from about 2.0:1.0 to about 4.0:1.0, preferably from about 3.3:1.0 to about 3.5:1.0, wherein M represents the alkali metal. The amount of silicate glass solids (from component A) in the compositions of the invention generally ranges from about 10 to about 32 percent by weight, preferably from about 15 to about 25 percent by weight.

Although the above alkali metal silicates are preferred, water-soluble and/or water-dispersible alkali metal silicates which have been modified with an oxide or an hydroxide of a metal such as Al, Ca, Mg, Zr, V, Zn or Cs may also be used as component A. Oxide- or hydroxide-modified silicates may be obtained, for example, by mixing an aqueous solution of the appropriate metal oxide or metal hydroxide with the aqueous silicate and heating the mixture while stirring. Usually, the heating is conducted at about 50° to 100° C. for about 1 to 72 hours. However, if the reaction is conducted in a pressure vessel at a temperature higher than 100° C., the reaction time may be shorter. The amount of the oxide or hydroxide may be 0.5 to 3.0 parts by weight per 100 parts by weight (based on dry solids without water of crystallization) of the silicate.

The metal condensed phosphate hardener may be any such hardener generally known for use in silicate-based inorganic paints or coating compositions. The metal condensed phosphates for such hardener may be prepared, for example, by dehydration of one or more ortho phosphates at about 300° to about 1200° C. For example, condensed aluminum phosphate may be prepared by evaporating an aqueous 30 percent by weight $Al(H_2PO_4)_3$ solution to dryness and heating the resulting material to a temperature of about 400° C. to 500° C. Another example of a method of preparation of a condensed aluminum phosphate, described in U.S. Pat. No. 3,943,231, is to spray-dry a relatively dilute solution or suspension of an aluminum orthophosphate containing $P_2O_5$ and $Al_2O_3$ in the molar ratio desired in the final product at temperatures higher than 250° C. to effect direct transformation into condensed aluminum phosphates. German Pat. No. 1,252,835 describes a method for obtaining condensed aluminum phosphates wherein an aluminum phosphate solution is evaporated to dryness and the resulting material subjected to a two-step heat treatment at different temperatures. Finally, methods for preparing condensed iron phosphates and condensed aluminum phosphates are described in the Bulletin of the Societe Chemique deFrance, article No. 337, (1961), pages 2277-2282 and the Bulletin of the Societe Chemique deFrance, article No. 221, (1962), pages 1237-1243.

Metal condensed phosphates used as hardener in the present invention typically comprise condensed aluminum phosphates. Various condensed aluminum phosphates, including their methods of preparation, are described, for example, by d'Yvoire in the Bulletin of the Societe Chemique deFrance, (1961), article No. 337, at 2277-2282 and the Bulletin of the Societe Chemique deFrance, (1962), article No. 221 at 1237-1243 wherein a cyclic aluminum tetrametaphosphate, (i.e., the A-form of $Al(PO_3)_3$) and four long-chain polyphosphates (i.e., the B-, C-, D- and E-forms of $Al(PO_3)_3$) are identified. As reported by d'Yvoire, these condensed aluminum phosphates may be produced, for example, by reacting $P_2O_5$ and $Al_2O_3$ in a molar ratio respectively of from 4:1 to 15:1. U.S. Pat. No. 4,216,190, hereby incorporated by reference, describes a method for making B-form aluminum trimetaphosphate by the addition of concentrated ammonium hydroxide to a solution of aluminum dihydrogen phosphate, $Al(H_2PO_4)_3$, to effect the formation of a white precipitate which is directly converted to the B-form aluminum trimetaphosphate $Al(PO_3)_3$ by a single elevated temperature treatment. Condensed aluminum phosphates used as hardener in the present invention preferably comprise B-form aluminum metaphosphate, and most preferably comprise a mixture of A-form aluminum metaphosphate and B-form aluminum metaphosphate. When a mixture comprising A-, and B-form aluminum metaphosphates is used as hardener, the weight ratio of the B-form to A-form aluminum metaphosphate generally ranges from about 3:5 to about 4:1, preferably from about 7:3 to about 4:1.

The amount of metal condensed phosphate hardener solids in compositions of the invention ranges from about 2.0 to about 10 percent by weight based on the total composition. The weight ratio of total alkali metal silicate solids to metal condensed phosphate solids, respectively, in compositions of the invention generally ranges from about 1.7:1.0 to about 10.6:1.0, preferably from about 1.9:1.0 to about 2.6:1.0.

The condensed phosphate hardener used in the invention may be prepared, for example, by mixing the condensed phosphate with water to form an aqueous dispersion such as a slurry or paste. A water-soluble base is mixed with the aqueous dispersion of condensed phosphate until the pH of the mixture is greater than 9.5, preferably at least 10. The composition of the present invention is then formed by mixing the aqueous dispersion of condensed phosphate (component B) and the water-soluble and/or water-dispersible alkali metal silicate (component A) while the pH of the dispersion of condensed phosphate is at an appropriate value as described previously. Generally, the condensed phosphate dispersion is mixed with the water-soluble and/or water-dispersible silicate (component A) within about a few minutes from when the pH adjusted dispersion of condensed phosphate is prepared.

If the pH of the aqueous dispersion of condensed phosphate (component B) is too low just prior to mixing with the aqueous alkali metal silicate (component A), upon mixing, gel particles or lumps tend to occur in the composition, and highly undesirable lumps or particles tend to occur in cured coatings produced from the composition.

Bases suitable for raising the pH of the aqueous dispersion of hardener to an appropriate level in the present invention are believed not to form an insoluble coating on the condensed phosphate during the pH adjustment of the hardener dispersion.

Examples of bases which may be used to raise the pH of the aqueous dispersion of condensed phosphate include: alkali metal hydroxides such as sodium hydroxide, potassium hydroxide and lithium hydroxide; quaternary ammonium hydroxides such as tetraethyl ammonium hydroxide and tetraethanol ammonium hydroxide; ammonia; amines such as triethylamine and 3-(diethylamino)-propan-1-ol; tertiary sulfonium hydroxides such as trimethyl sulfonium hydroxide and triethyl sulfonium hydroxide; quaternary phosphonium hydroxides such as tetramethyl phosphonium hydroxide and tetraethyl phosphonium hydroxide; organosilanolates such as tripotassium γ-aminopropylsilantriolate, tripotassium N-(β-aminoethyl)-γ-aminopropylsilantriolate, dipotassium dimethylsilandiolate, potassium trimethylsilanolate, bis-tetramethylammonium dimethylsilandiolate, bis-tetraethylammonium dimethylsilandiolate, and tetraethylammonium trimethylsilanolate; and mixtures thereof. Of the bases described above, alkali metal hydroxides, quaternary ammonium hydroxides, ammonia and amines are preferred. The alkali metal hydroxides are particularly preferred.

The organosilanolates, which may be used as the base to adjust the pH of the aqueous dispersion of condensed phosphate, are known and correspond to the formula $R_nSi(OM)_{4-n}$ wherein R is an organic radical, M is an alkali metal or a quaternary ammonium radical and n is an integer from 1 to 3. R may be an organic group such as an aliphatic group, a cycloaliphatic group, an araliphatic group, an alkenyl group, etc., and R may be substituted with groups such as amino, mercapto and/or halogen. When organosilanolates are used as the base to raise the pH of the hardener dispersion, it is preferred to use an alkali metal salt of 3-aminopropylsilantriol, an alkali metal salt of dimethylsilandiol and mixtures thereof. It is also preferred to use potassium as the alkali metal in these alkali metal salts.

The base used at the specified levels in the present invention reduces the reactivity of the condensed phosphate hardener for the water-soluble and/or water-dispersible alkali metal silicate, thereby increasing the useful life of the composition and eliminating either completely or substantially shock, i.e., undesirable particle formation between the silicate (component A) and the condensed phosphate. The useful life of the compositions of the present invention ranges from about 15 to about 90 minutes. As used herein, "useful life" means the period of time the composition remains fluid and essentially free of undesirable particles or lumps such that, for example, a cured coating produced from the composition is essentially lump-free. Thus, the use of the base in the specified amount results in compositions having better dispersion characteristics as evidenced by lower viscosity, better sprayability and a consistency which is essentially lump-free. The percent by weight of the base in the compositions of the invention generally ranges from about 0.2 percent to about 0.8 percent, preferably from about 0.2 percent to about 0.5 percent. As discussed previously, the base is admixed with the dispersion of condensed phosphate hardener before the condensed phosphate hardener is admixed with the water-soluble and/or water-dispersible alkali metal silicate (component A). The amount of base used is sufficient to raise the pH of the aqueous dispersion of condensed phosphate (component B) to greater than 9.5, typically to at least 10, before the hardener dispersion is admixed with the water-soluble and/or water-dispersible alkali metal silicate (component A). The composition of the invention is then formed by combining the hardener dispersion and water-soluble and/or water-dispersible alkali metal silicate before the pH of the hardener dispersion falls below 9.5, preferably before falling below 10.

If the base is used in amounts appreciably greater than that needed to prevent shock when the hardener dispersion is combined with the water-soluble and/or water-dispersible silicate, the resultant properties of coatings formed from the compositions will reflect properties such as decreased water resistance, as one in the art would anticipate from using excessive levels of base. Thus, it is indeed surprising that cured coatings produced from the compositions of the present invention in which the pH of the hardener dispersion (component B) is raised to such high levels in accordance with the invention, are highly water- and detergent-resistant, in addition to being heat-resistant, crack-resistant and lump free.

The amount of water in the compositions of the invention may vary widely depending on the intended use. Generally, the aqueous phase of the compositions of the invention contains from about 42 percent to about 64 percent by weight water, preferably from about 50 percent to about 60 percent by weight water.

In a preferred embodiment, the compositions of the invention include at least one pigment. Suitable pigments include those generally known and used in the paint and coatings industry provided that they are stable at the high pH values of the compositions of the invention and provided they do not precipitate the aqueous alkali metal silicate in these compositions. It is preferable to use inorganic pigments where compositions for high temperature applications are desired. Examples of suitable pigments include: alumina hydrates, barium metaborate, zinc oxide, white and colored pigments based on titanium dioxide, iron oxide red, iron oxide black, manganese black, and carbon black. The pigments are generally pulverized solids and mixtures of pigments also may be employed. Particularly preferred pigments include titanium dioxide available as R-900 from E. I. duPont de Nemours & Company, iron oxide, and Shepherd Black #1 available from the Shepherd Chemical Company. Pigments may be incorporated at any stage of formulation of the compositions, but preferably are included in the aqueous dispersion of condensed phosphate hardener prior to combining the hardener with the water-soluble and/or water-dispersible alkali metal silicate (component A).

Compositions of the invention may also include one or more fillers. Suitable fillers include inert fillers and/or reinforcing fillers generally known in the art provided they are stable at the high pH values of the compositions of the invention and provided they do not precipitate the silicate in the compositions. Examples of suitable fillers include: silica, mica, clay, bentonite, sand, glass fibers and steel fibers. The fillers may be incorporated at any stage of formulation of the compositions.

Additionally, the compositions of the invention may contain one or more generally known additives. Examples of additives include: dyes, defoamers, release agents, anti-mar agents, flow control agents, surfactants, thickeners, fungicides and mildewcides. These various additives may be incorporated at any stage in the formulation of the compositions of the invention.

When pigments, fillers, and/or additives, previously described, are included in a composition of the invention, they generally may be used in amounts of about 32 percent to about 80 percent solids, preferably from about 50 percent to about 60 percent solids, based on the total volume of solids present in the composition.

The compositions of the invention have a variety of applications. They are particularly useful in coatings, especially where high temperature, water and detergent resistance are desired. The compositions may be applied to a wide variety of substrates including, for example, wood, metal, glass, wallboard, cement and the like. They may be applied by any known method including, for example, brushing, dipping, rolling, flow coating, doctor roll coating, spraying, and the like. Generally known spray techniques and equipment may be utilized.

The compositions of the invention can be cured at moderate or elevated temperatures. They may be air dried at ambient atmospheric temperatures, but the compositions so cured are not as water resistant and uniform (e.g. with respect to absence of cracking) as when cured by baking at moderate or elevated temperatures. Generally, the compositions of the invention can be cured in relatively short periods of time at temperatures as low as about 100° C., typically as low as about 200° C., to form smooth, essentially lump-free, durable heat-, water-, and detergent-resistant coatings. Of course, the curing time will vary depending on the curing temperature used.

The following examples illustrate the invention. Amounts and percentages are by weight unless specified otherwise. When used herein, "pbw" means "parts by weight."

EXAMPLE I (1a) B-form aluminum metaphosphate and A-form aluminum metaphosphate in the proportions indicated in the following TABLE 1 were ground with enough water to produce each of the aqueous slurries, herein designated A, B and C, containing the percents by weight solids indicated in TABLE 1.

TABLE 1

| Slurry | B-form Aluminum Metaphosphate (pbw) | A-form Aluminum Metaphosphate (pbw) | % Solids |
|---|---|---|---|
| A | 64 | 36 | 57.8 |
| B | 50 | 50 | 56.9 |
| C | 34 | 66 | 54.9 |

(1b) Three aluminum metaphosphate hardeners, herein designated HA, HB and HC, were prepared by mixing slurries A, B and C respectively with the components indicated and in the amounts set forth in the following TABLE 2.

TABLE 2

|  | Hardner HA (pbw) | Hardener HB (pbw) | Hardener HC (pbw) |
|---|---|---|---|
| water | 145.5 | 141.4 | 131.8 |
| aqueous 50% KTPP[1] | 20.0 | 20.0 | 20.0 |
| Strodex PK-90[2] | 3.5 | 3.5 | 3.5 |
| Strodex SEK-50[3] | 6.2 | 6.2 | 6.2 |
| Foamaster VL[4] | 2.3 | 2.3 | 2.3 |
| Attagel 40[5] | 14.0 | 14.0 | 14.0 |
| Slurry A | 259.5 | — | — |
| Slurry B | — | 263.6 | — |
| Slurry C | — | — | 273.2 |
| Micromica C-1000[6] | 45.0 | 45.0 | 45.0 |
| Minusil-10[7] | 20.0 | 20.0 | 20.0 |
| TiO$_2$[8] | 104.6 | 104.6 | 104.6 |

[1] A 50% solution of potassium tripolyphosphate.
[2] A surfactant containing 90% solids comprising potassium salts of organophosphates available from Dexter Chemicals Corp.
[3] A surfactant containing 50% solids comprising potassium salts of organophosphates available from Dexter Chemicals Corp.
[4] An antifoaming agent available from Diamond Shamrock Corp.
[5] A clay additive available from Englehard Minerals Corp.
[6] Mica available from English Mica Corp.
[7] A silica extender available from PGS Corp.
[8] Titanium dioxide pigment available as R-900 from E. I. duPont de Nemours & Company (1c) 16.2 pbw of an aqueous 50% potassium hydroxide solution was slowly added to each of the hardeners, HA, HB and HC, thereby raising the pH of each hardener to 10.5.

Then, within a few minutes from when each pH adjusted hardener was prepared, each hardener was mixed with an aqueous alkali silicate composition containing 43.0 pbw water, 422.4 pbw aqueous sodium silicate (37.9% solids; mole ratio of SiO$_2$/Na$_2$O = 3.40), 360.5 pbw aqueous potassium silicate (38.8% solids; mole ratio of SiO$_2$/K$_2$O = 3.30), and 44.6 pbw mica (Micromica C-3000 from English Mica Corporation) to produce three compositions, herein designated CA, CB and CC respectively, which had the characteristics represented in the following TABLE 3.

TABLE 3

|  | Composition CA | Composition CB | Composition CC |
|---|---|---|---|
| total % solids | 46.8% | 46.8% | 46.8% |
| % silicates (solids) | 19.9% | 19.9% | 19.9% |
| % aluminum metaphosphate | 9.95% | 9.95% | 9.95% |
| Weight ratio of B-form to A-form aluminum metaphosphate | 64/36 | 50/50 | 34/66 |

(1d) After about 30 minutes from preparation, each of the compositions, CA, CB and CC, described above, was sprayed onto a steel panel to form a lump-free, wet film having a thickness of about 6 mils. Each of the panels was cured for 45 minutes at 220° C. to produce a smooth, lump-free, dry film having a thickness of from 2.5 to 3 mils.

All of the coated panels were then subjected to the following tests with the indicated results. When subjected to a temperature of 537.8° C. for 1 hour, no blistering occurred on any of the panels. When soaked in boiling water for 24 hours, no softening or discoloration occurred in any of the coatings. When subjected to a 1:1 by weight mixture of vegetable oil to oleic acic at 400° C. for 8 hours, only very slight staining, which was hardly noticeable, occurred on the coatings.

(1e)(Comparison) A composition was prepared in the same manner as composition CA in part (1c) above except that only enough aqueous 50% potassium hydroxide was added to hardener HA to raise the pH of the hardener to 8.5. After about 30 minutes from preparation, this composition was sprayed onto a steel panel to form a wet film having a thickness of about 6 mils. Numerous undesirable lumps were observed in the wet film. The panel then was cured for 45 minutes at 220° C. to produce a dry film having a thickness of from 2.5 to 3 mils. Although similar results were obtained for this cured film as compared to coatings prepared from compositions CA, CB and CC in EXAMPLE I when subjected to the heat, hot water soak and stain tests, this cured film was permeated with lumps.

EXAMPLE II (2a) An aluminum metaphosphate hardener in the form of a paste was prepared by milling the components indicated in the amounts set forth in the following TABLE 4.

TABLE 4

|  | (pbw) |
|---|---|
| water | 510.0 |
| aqueous 50% KTPP* | 40.0 |
| Strodex PK-90* | 7.0 |
| Strodex SEK-50* | 12.4 |
| Foamaster VL* | 4.6 |
| HB hardener** | 240.0 |
| A-form aluminum metaphosphate*** | 60.0 |
| TiO$_2$* | 209.2 |
| Minusil-10* | 40.0 |
| Micromica C-1000* | 90.0 |

*Described in EXAMPLE 1.
**An aluminum metaphosphate hardener containing about 80% by weight B-form aluminum metaphosphate and about 20% by weight A-form aluminum metaphosphate available as HB hardener from Pennwalt Corp.
***Available from Rhone-Poulenc, Inc.

(2b) An aqueous alkali silicate composition was prepared by milling 86.0 pbw water, 721.0 pbw aqueous potassium silicate (38.8% solids: mole ratio of SiO$_2$/K$_2$O = 3.30), 844.8 pbw aqueous sodium silicate (37.9% solids; mole ratio of SiO$_2$/Na$_2$O = 3.40), 29.4 pbw clay (Attagel 40 from Englehard Minerals Corp.), and 89.2 pbw mica (Micromica C-3000 from English Mica Corp.).

(2c) Three coating compositions herein designated CA, CB, and CC respectively were prepared as follows.

Three 300 pbw samples of the aluminum metaphosphate hardener of part (2a) above were mixed with sufficient aqueous 50% potassium hydroxide solution to raise the pH to 9.0, 9.5 and 10.0 respectively. These three potassium hydroxide treated hardeners will be designated herein HA, HB, and HC respectively.

Then within a few minutes from when each pH adjusted hardener was prepared, each hardener (HA, HB, and HC) was mixed with 437.8 pbw of the aqueous alkali silicate composition of part (2b) above to form three coating compositions herein designated respectively CA, CB, and CC.

Coating composition CA prepared from hardener HA contained an undesirable amount of lumps. Coating compositions CB and CC prepared from hardeners HB and HC contained almost no lumps.

Each of the three coating compositions (CA, CB, and CC), was sprayed onto six dry steel panels to form three sets of six panels each. The steel panels were all baked at 220° C. for 1 hour.

The six cured coatings prepared from coating composition CA for which the pH of the hardener dispersion, HA, had been adjusted to 9.0, were relatively smooth but exhibited extremely poor adhesion to the steel substrate at both the edges and the interior faces of all six panels as evidenced by severe cracking and peeling.

The six cured coatings prepared from coating composition CB for which the pH of the hardener dispersion, HB, had been adjusted to 9.5 were relatively smooth but all exhibited extremely poor adhesion as evidenced by cracked and peeled edges on all but one of the panels and cracked and peeled interior faces on all six panels.

The six cured coatings prepared from coating composition CC for which the pH of the hardener dispersion, HC, had been adjusted to 10.0 were all smooth. Only two of the six panels exhibited any cracking or peeling at the edges and these defects were minor. None of these six panels exhibited any cracking or peeling of the coating at the interior faces.

What is claimed is:

1. An aqueous curable composition consisting essentially of:
   (a) from about 10 to about 32 percent by weight of a water-soluble and/or water-dispersible alkali metal silicate; and
   (b) from about 2 to about 10 percent by weight of a metal condensed phosphate hardeneer in the form of an aqueous dispersion, said aqueous dispersion containing a water-soluble base in an amount such that the pH of said aqueous dispersion of said hardener is greater than 9.5.

2. The composition of claim 1 wherein said base is in an amount such that the pH of said aqueous dispersion of said hardener is at least 10.

3. The composition of claim 1 wherein the amount of said silicate ranges from about 15 percent to about 25 percent by weight and the amount of said hardener ranges from about 8 percent to about 10 percent by weight.

4. The composition of claim 3 wherein said base is in an amount such that the pH of said aqueous dispersion of said hardener is at least 10.

5. The composition of claim 1 or 3 further comprising a pigment, a filler, an additive or a mixture thereof.

6. The composition of claim 1 or 3 wherein said base is selected from the group consisting of an alkali metal hydroxide, ammonia, an amine, a quaternary ammonium hydroxide, a quaternary phosphonium hydroxide, a tertiary sulfonium hydroxide and mixtures thereof.

7. The composition of claim 1 or 3 wherein said base is an organosilanolate or a mixture of organosilanolates.

8. The composition of claim 6 wherein said base is potassium hydroxide or sodium hydroxide.

9. The composition of claim 7 wherein said organosilanolate corresponds to the formula:

$$R_nSi(OM)_{4-n}$$

wherein R is an organic radical, M is an alkali metal or a quaternary ammonium radical and n is an integer from 1 to 3.

10. The composition of claim 9 wherein said organosilanolate is dipotassium dimethylsilandiolate or an alkali metal salt of 3-aminopropylsilantriol.

11. The composition of claim 8 wherein said silicate is a water-soluble alkali metal silicate.

12. The composition of claim 1 or 3 wherein said metal condensed phosphate hardener comprises a condensed metal metaphosphate.

13. The composition of claim 12 wherein said condensed metal metaphosphate is a B-form condensed metal metaphosphate.

14. The composition of claim 13 wherein said B-form condensed metal metaphosphate is B-form condensed aluminum metaphosphate.

15. The composition of claim 12 wherein said metal condensed phosphate hardener comprises a mixture of B-form condensed metal metaphosphate and A-form condensed metal metaphosphate.

16. The composition of claim 15 wherein said metal condensed phosphate hardener comprises a mixture of B-form condensed aluminum metaphosphate and A-form condensed aluminum metaphosphate.

17. The composition of claim 16 wherein said B-form condensed aluminum metaphosphate and said A-form condensed aluminum metaphosphate are in a ratio by weight respectively ranging from about 3:5 to about 4.0:1.0.

18. The composition of claim 11 wherein said water-soluble alkali metal silicate has an $SiO_2:M_2O$ mole ratio of about 2.0:1.0 to about 4.0:1.0.

19. A method of producing an aqueous curable composition comprising:
   (a) mixing from about 10 percent to about 32 percent by weight of a water-soluble and/or water-dispersible alkali metal silicate; with
   (b) from about 2.0 to about 10 percent by weight of a metal condensed phosphate hardener in the form of an aqueous dispersion, said aqueous dispersion containing a water-soluble base in an amount such that the pH of said aqueous dispersion of said hardener is greater than 9.5.

20. The method of claim 19 wherein the pH of said aqueous dispersion of said hardener is at least 10.

21. The method of claim 19 or 20 wherein said base is selected from the group consisting of an alkali metal hydroxide, ammonia, an amine, a quaternary ammonium hydroxide, a quaternary phosphonium hydroxide, a tertiary sulfonium hydroxide and mixtures thereof.

22. The method of claim 19 or 20 wherein said base is organosilanolate or a mixture of organosilanolates.

23. The method of claim 21 wherein said silicate is a water-soluble alkali metal silicate having a $SiO_2:M_2O$ mole ratio ranging from about 2.0:1.0 to about 4.0:1.0 and said metal condensed phosphate hardener comprises a mixture of B-form condensed aluminum metaphosphate and A-form condensed aluminum metaphosphate, the ratio by weight of B-form to A-form condensed aluminum metaphosphate in said mixture ranging from about 3:5 to about 4:1.

24. A method of forming a substantially inorganic coating on a substrate comprising:
   (a) applying to said substrate an aqueous coating composition consisting essentially of (i) from about 10 percent to about 32 percent by weight of a water-soluble and/or water-dispersible alkali metal silicate, and (ii) from about 2.0 to about 10 percent by weight of a metal condensed phosphate hardener in the form of an aqueous dispersion, said aqueous dispersion containing a water-soluble base in an amount such that the pH of said aqueous dispersion of said hardener is greater than 9.5; and (b) curing said coating composition.

25. The method of claim 24 wherein said metal condensed phosphate hardener comprises a B-form condensed aluminum metaphosphate.

26. The method of claim 24 wherein said silicate is a water-soluble alkali metal silicate having a $SiO_2:M_2O$ mole ratio ranging from about 2.0:1.0 to about 4.0:1.0 and said metal condensed phosphate hardener comprises a mixture of B-form condensed aluminum metaphosphate and A-form condensed aluminum metaphosphate, the ratio by weight of B-form to A-form condensed aluminum metaphosphate in said mixture ranging from about 3:5 to about 4:1.

27. The method of claim 26 wherein the pH of said aqueous dispersion of said hardener is at least 10.

* * * * *

UNITED STATES PATENT AND TRADEMARK OFFICE
CERTIFICATE OF CORRECTION

PATENT NO. : 4,319,926

DATED : March 16, 1982

INVENTOR(S) : Peter M. Nowakowski, William G. Boberski, and Jerome A. Seiner

It is certified that error appears in the above-identified patent and that said Letters Patent are hereby corrected as shown below:

In Claim 1, column 9, line 37, "hardeneer" should read --hardener--.

Signed and Sealed this

Twenty-ninth Day of June 1982

[SEAL]

Attest:

Attesting Officer

GERALD J. MOSSINGHOFF

Commissioner of Patents and Trademarks